United States Patent [19]

Kähler

[11] 4,201,156
[45] May 6, 1980

[54] LIVE POULTRY CONVEYING, COUNTING AND CRATING DEVICE

[76] Inventor: Werner Kähler, Post Hennstedt, D-2246 Norderheistedt, über Heide, Fed. Rep. of Germany

[21] Appl. No.: 907,748

[22] Filed: May 19, 1978

[30] Foreign Application Priority Data

May 25, 1977 [DE] Fed. Rep. of Germany ....... 2723686

[51] Int. Cl.² .............................................. A01K 29/00
[52] U.S. Cl. ..................................................... 119/82
[58] Field of Search ................................... 119/21, 82

[56] References Cited

U.S. PATENT DOCUMENTS

| | | | |
|---|---|---|---|
| 3,103,915 | 9/1963 | Crain et al. | 119/82 |
| 3,110,388 | 11/1963 | Elliott et al. | 119/82 X |
| 3,741,417 | 6/1973 | Blankenship | 119/82 X |

*Primary Examiner*—Louis G. Mancene
*Assistant Examiner*—Robert P. Swiatek
*Attorney, Agent, or Firm*—Heinrich W. Herzfeld; Gilbert L. Wells

[57] ABSTRACT

A live poultry-conveying, counting and crating device is described which comprises
 (a) a chicken house;
 (b) a counting station;
 (c) live poultry-conveying mechanism for conveying live poultry inside and out of the chicken house through the counting station;
 (d) a loading chute having a bottom downwardly inclined at an acute angle on which the live fowl can slide downwardly, an inlet opening at the upper end of the latter for receiving live poultry from the live poultry-conveying mechanism, and an outlet opening at the lower end of the inclined bottom; wherein the counting station is associated with the chute for counting live poultry passing down the latter; and
 (e) a transport mechanism for transporting empty coops having an aperture in their top face to the outlet opening of the chute and coops filled with live poultry away from the outlet opening of the chute;
the transport mechanism comprises an arrester plate for stopping each coop as it arrives at the outlet opening for a time sufficient to fill the coop with a determined number of live poultry, and tilting mechanism for tilting each coop as it sojourns at the outlet opening of the chute, at an angle whereby the aperture of the coop is inclined by an acute angle toward the outlet opening.

The poultry conveying mechanism preferably comprises a terminal zone having a joint with the inlet opening of the loading chute and a cover over at least the terminal zone and joint of the live poultry-conveying mechanism and the loading chute for keeping at least the terminal zone, joint and chute dark.

4 Claims, 13 Drawing Figures

LIVE POULTRY CONVEYING, COUNTING AND CRATING DEVICE

BACKGROUND OF THE INVENTION

This invention relates to a live poultry-conveying, counting and crating device comprising
  (a) a chicken house;
  (b) a counting station;
  (c) live poultry-conveying means for conveying live poultry inside and out of the chicken house through the counting station;
  (d) a loading chute having an inlet opening at the upper end of the latter and adapted for receiving live poultry from the live poultry-conveying means, and an outlet opening at the lower end of the latter; and
  (e) a transport mechanism for transporting empty coops having an aperture in their top face to the outlet opening of the chute and coops filled with live poultry away from the outlet opening of said chute;
    said transport mechanism comprising means for stopping each coop as it arrives at said outlet opening for a time sufficient to fill said coop with a determined number of live poultry.

A live poultry conveying, counting and crating device of the above type is described in U.S. Pat. No. 3,110,388 to G. Elliott et al. However, conveying live poultry to a drop chute of the type used in the known device easily leads to damaging of the fowl and/or to jamming in the chute which in this device is in the form of a hopper. Moreover, filling of the coops having a central opening large enough to admit a fowl at a time, with the coop in a horizontal position standing substantially upright on its flat bottom is cumbersome as the fowl get into each other's way thus requiring a considerable lapse of time for filling each coop with the required number of fowl, usually being in the order of 15 to 20 individuals.

OBJECTS AND SUMMARY OF THE INVENTION

It is therefore an object of the invention to provide a device of the initially described type which permits simple conveyance of live poultry from a conveyor belt through a chute into a coop without any danger of damaging a fowl or jamming of the latter in the chute. It is another object of the invention to provide means for crating live poultry emerging from the chute at an accelerated rate, loading a dozen or more fowl within less than a minute.

These objects are attained in a device of the initially described type, wherein the loading chute has a bottom downwardly inclined at an acute angle, preferably of about 30 to 50 degrees, on which bottom the live fowl can slide downwardly, an inlet opening at the upper end of the bottom and adapted for receiving live poultry from the live poultry-conveying means, and an outlet opening at the lower end of the inclined bottom, wherein the counting station is associated with the loading chute, and wherein the transport mechanism comprises tilting means for tilting each coop as it sojourns at the outlet opening of said chute, at an angle whereby the aperture of said coop is inclined by an acute angle toward said outlet opening. The angle of inclination of the coop, when in tilted position, toward the outlet opening of the chute is preferably about 25 to 50 degrees toward the horizontal plane.

Advantageously, the aperture in the top face of each coop is displaced from the center toward that side of the coop which is uppermost when the coop is in the tilted position at the outlet opening of said chute, the aperture registering with said outlet opening.

It is well-known that fowl will normally remain motionless and stationary when positioned on a moving conveyor belt.

However, I have found that shifting of the fowl from the conveyor belt onto the downwardly inclined bottom of the chute will take place more smoothly if at least the terminal zone of the conveyor belt up to its joint to the inlet opening of said loading chute is provided with cover means which keep the said zone, joint and loading chute dark.

The device according to the invention thus presents a solution for the problem presented nowadays by the general demand for accelerated performance in conveying, counting and crating live poultry, preferably without work-consuming methods of tying down the individual fowl to a conveyor belt and releasing it again, and to count and package such fowl without damaging them, and to transport the crated poultry to a truck or the like transport vehicle with a minimum requirement of personnel, avoiding, preferably completely, bodily contact between the personnel and the poultry.

The device according to the invention permits introducing 18 to 20 individual fowl into a coop of the type described within 6 to 7 seconds. Counting of the poultry is preferably carried out by electrooptical apparatus known per se.

BRIEF DESCRIPTION OF THE DRAWINGS

Further details of the live poultry conveying, counting and crating device according to the invention are explained in the description which follows of a preferred embodiment thereof in conjunction with the drawings in which.

DETAILED DESCRIPTION OF THE EMBODIMENTS SHOWN IN THE DRAWINGS

Figure 1:
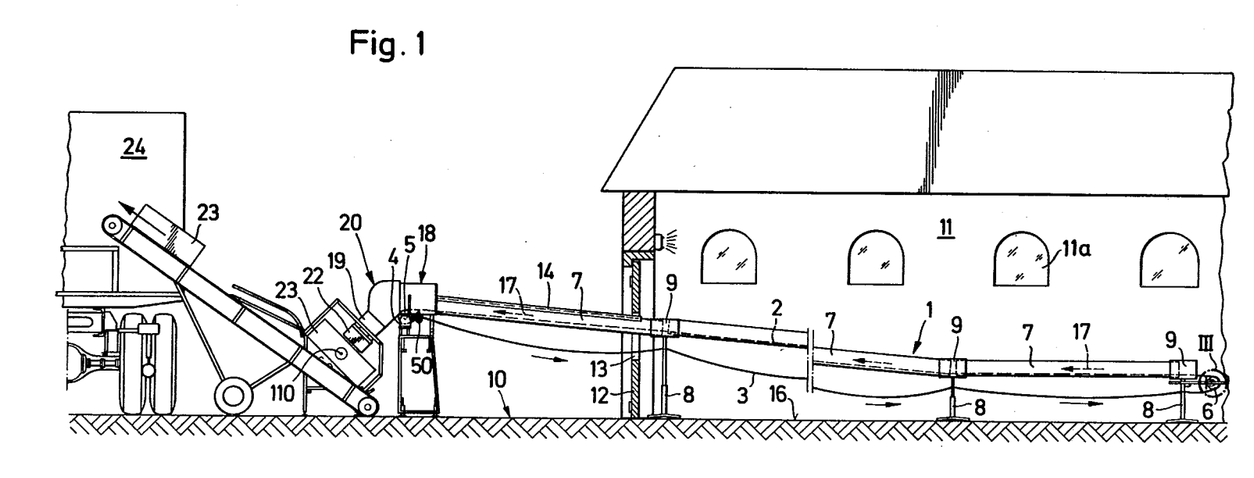
FIG. 1 is a schematical representation of a preferred embodiment of the device for conveying, counting and crating live poultry installed in and outside a chicken house.
Figure 2:
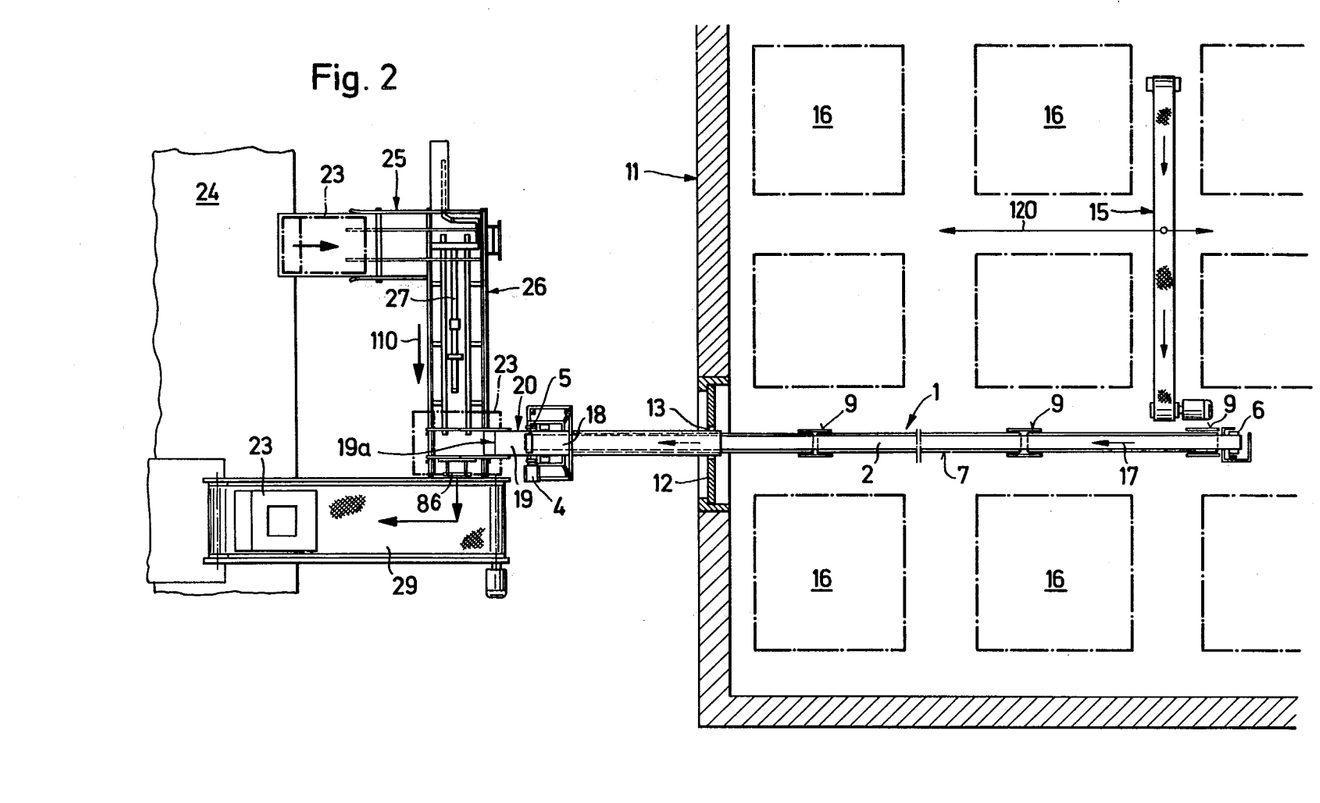
FIG. 2 is a schematical top view of the embodiment of FIG. 1.

The chicken house 11 shown in FIGS. 1 and 2 serves to grow and fatten live poultry such as fattened chicken to be grilled, laying-hens, capons, and the like fowl.

Poultry from chicken house 11 is conveyed to a truck or lorry 24 by means of the conveying, counting and crating device according to the invention which comprises a conveyor belt 1 having an upper reach 2 on which the individual fowls are placed, preferably by hand, in the house 11, which is preferably darkened by means of blinds (not shown) across the windows 11a. The conveyor belt is preferably arranged longitudinally in the house 11 and passes out of an opening 13 in a door 12 which is located in one end wall of house 11, to the outside.

The conveyor belt is conventionally driven by drive roller 5 driven by a motor 4 and is run with its lower or return reach 3 about a tensioning roller 50 and a reversing roller 6.

The advancing upper reach 2 extends in open-topped channels 7 of U-shaped cross-section which are supported on U-shaped holders 9 mounted on standards or trusses 8 of adjustable height. The return reach 3 passes through windows 37 provided in the standards 8 and rests on the sills of these windows to avoid excessive sagging.

The region of the conveyor belt 1 which is outside the house 11 is provided with a cover element 14 whereby its interior is kept dark.

As shown in FIG. 2, one or several transverse conveyor belts 15 can be provided in chicken house 11 of large enough width, to facilitate conveying fowl across the house 11 to the main conveyor belt 1 which is arranged longitudinally in the house 11. The fowl sit quietly on the floor in fenced-in areas 16 of the darkened house 11 and can be easily sorted and placed by hand on the conveyor belts 15 and/or 1.

The fowl are transported on the upper reach 2 of conveyor belt 1 in the direction of the arrows 17 out of house 11 and through the zone darkened by cover 14 outside the house to a crating device 20 which comprises a downwardly inclined chute 19 and a counter 18 connected to the entry port 51 of the latter. The discharge end of upper reach 2 ends in the entry port 51 which is surrounded by a closed circumferential sleeve wall 56 and thus kept dark. Cover 14 also extends into this sleeve wall 56.

Figure 6:
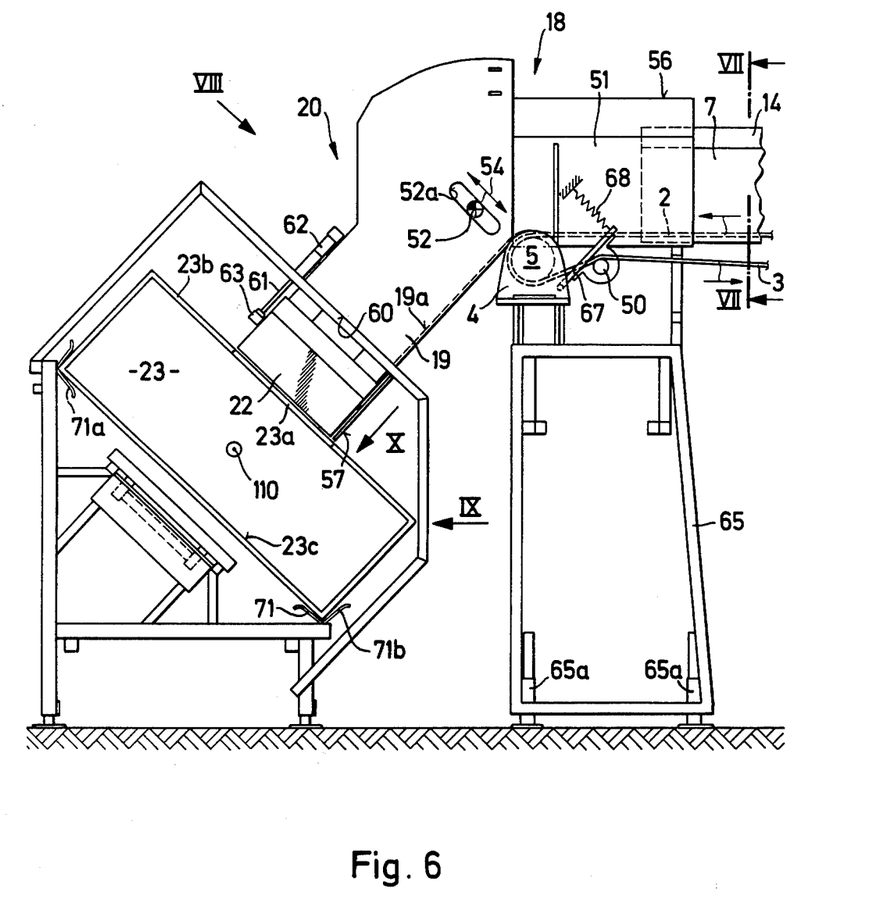
FIG. 6 is a schematic side view of the counting and crating means of the device shown in FIGS. 1 and 2.

At its lower end or exit 60, the inclined chute 19 is provided with a flap door 22 which is controlled by, or together with, the counter 18 and releases groups of fowl containing about eighteen to twenty individual fowl. As the flaps of flap door 22 are opened, they release a fowl at a time into a coop 23 which has an opening 23a in its top face 23b (FIG. 6). After the desired number of fowl, for instance eighteen, has been filled into the coop 23, the latter is closed by a lid (not shown).

The empty coops 23 are moved from a stack thereof in a ware-house or on a truck or lorry 24 via a loading chute 25 to a transverse coop-transporting device 26 which conveys with the aid of a hydraulic pusher 27 an empty coop 23 in the direction of arrow 110 on to guide rails 71 and in filling position in which its opening 23a registers with chute exit 60. After filling is terminated, the filled and closed coop 23 is pushed on to a conveyor belt 29 which returns it to the truck or lorry 24.

Figure 3:
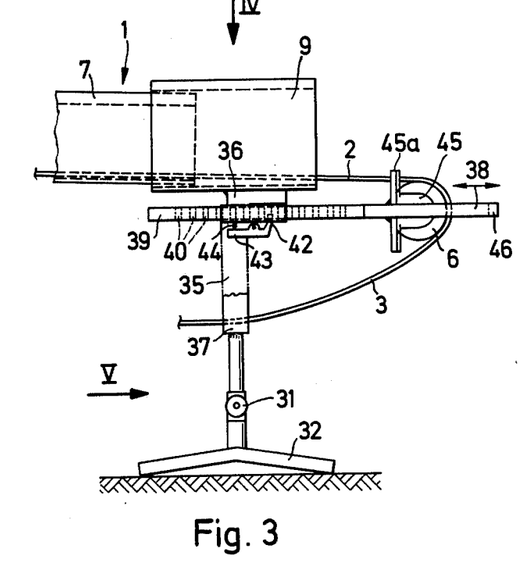
FIG. 3 is an enlarged detail of the conveyor means shown in zone III of FIG. 1.
Figure 4:
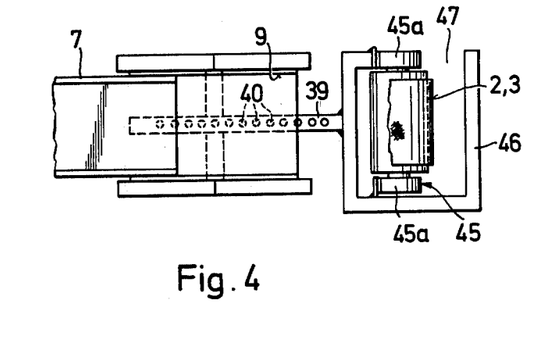
FIG. 4 is a top view of the conveyor means shown in FIG. 3.
Figure 5:
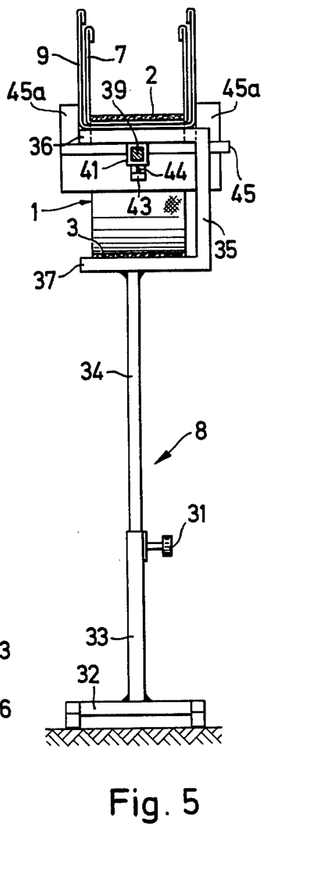
FIG. 5 is a side view of the conveyor means viewed in the direction of arrow V in FIG. 3.

A preferred embodiment of the terminal standard 8 supporting the return roller 6 inside the chicken house 11 is illustrated in FIGS. 3, 4 and 5 (Zone III in FIG. 1).

The standard 8 comprises a foot 32 which bears a lower tube 33 in which is inserted an upper tubular element 34. The height of the standard 8 can be adjusted by telescoping tubular element 34 into or out of tube 33 and fixing it in a desired position by means of an arresting screw 31.

At the upper end of tubular element 34 there is rigidly affixed a double-angle C-shaped hoop 35 having two horizontal cross-bars 36 and 37, the latter being supported on tubular element 34, and a connecting lateral upright part of C-shaped hoop 35 connecting cross-bars 36 and 37.

On its upper side, cross-bar 36 bears the U-shaped holder 9 in which channel 7 containing the upper reach 2 of conveyor belt 1 is supported.

The lower cross-bar 37 of C-shaped hoop 35 bears the lower reach 3 of conveyor belt 1. From the inner side, of cross-bar 36, there depends, welded thereto, a guide sleeve 41 whose inner bore is of square cross section and has an adjusting rod 39 passing therethrough which is provided with notches 40 and bears affixed on its free end, extending toward the adjacent end of conveyor belt 1, a cage 46 in which is fixedly mounted a roller bracket 45 which in turn bears rotatably the reversing roller 6 about which conveyor belt 1 is laid passing through slot 47 in cage 46.

On guide sleeve 41 there is articulatedly mounted a lock pawl 43 urged to engage one of notches 40 of rod 39 by means of a spring 44.

The extensions 45a of roller bracket 45 prevent conveyor belt 1 from running laterally off roller 6 during operation.

Figure 7:
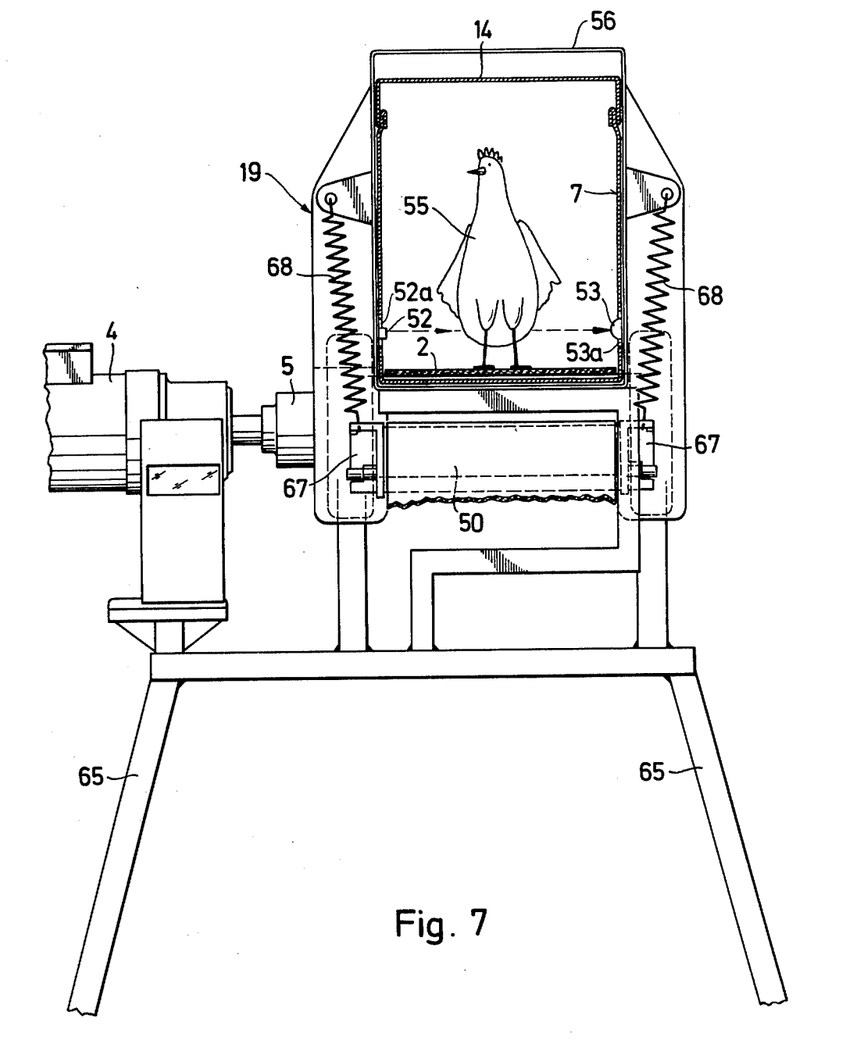
FIG. 7 is a partially sectional front view of the counting means shown in FIG. 6.
Figure 8:
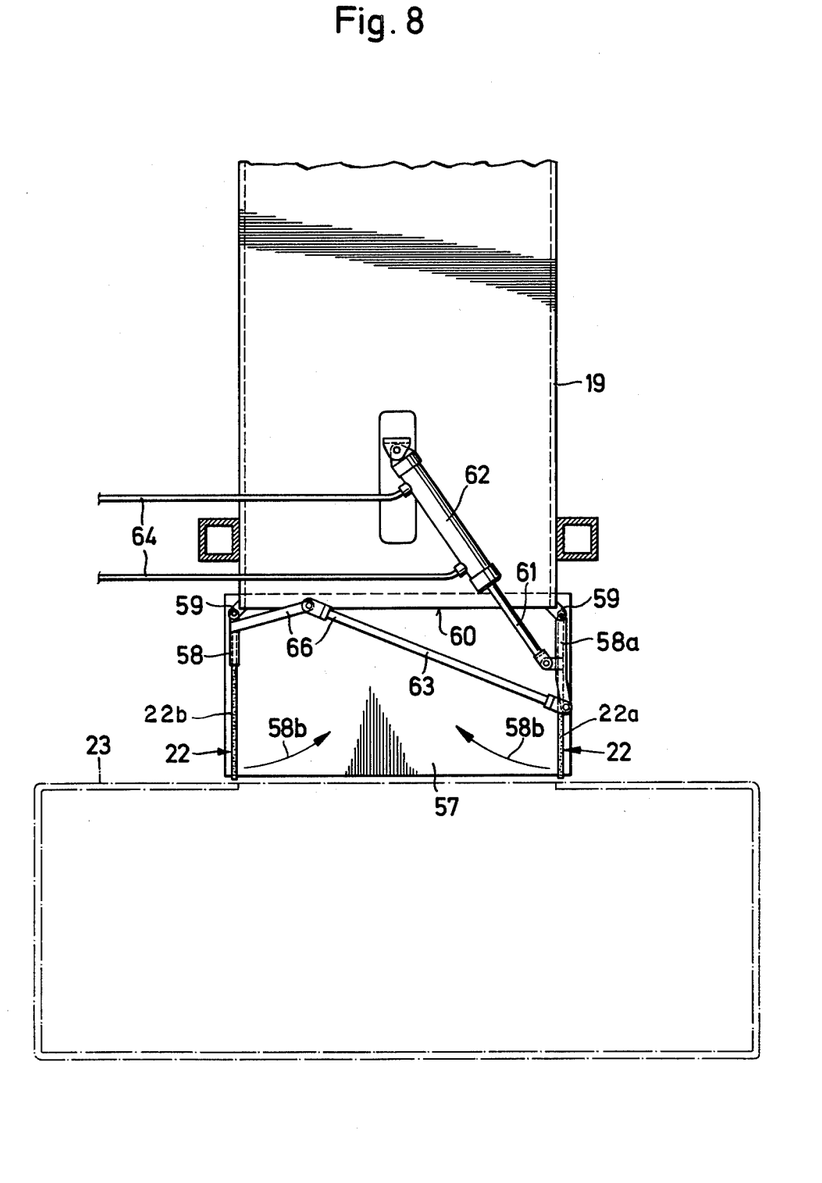
FIG. 8 is a detail of the crating means viewed in the direction of arrow VIII in FIG. 6.

The crating installation 20 comprising the counter 18 and the chute 19 is shown in detail in FIGS. 6, 7 and 8. In this installation an individual fowl 55 arrives standing on the upper, advancing reach 2 (from the right in FIG. 6 and from in front in FIG. 7). Reach 2 passes through the channel 7 which is darkened by cover 14 into the darkened entry port 51 which is supported on a stand 65 having adjustable legs 65a. The fowl 55 pass therein an optical counter 18 having photoelectric cells 52 and 53 (FIG. 7) which are displaceable in elongated slots 52a and 53a, wherein their height can be adjusted (double arrow 54), thereby changing the level of the detecting light beam therebetween depending on the size of the fowl to be counted (e.g. chicks or hens).

Instead of being provided in the sidewall 56 of entry port 51 (FIG. 7) the counter can also be provided in the sidewall of chute 19 (FIG. 6). Entry port 51 is kept dark by its circumferential sidewall 56 having a lid which can be detachable to facilitate cleaning. The fowl 55 then slide down the inclined bottom 19a of chute 19. At the exit 60 of chute 19, there are provided two flaps 22a and 22b (FIG. 8) constituting the flap door 22. When this door 22 is opened as a counted fowl 55 slides down chute 19, the fowl passes on to an inclined board or ramp 57 being a prolongation of chute bottom 19a, the lower end of which registers with a rim of the aperture 23a in a coop 23 which is in position for receiving a determined number of fowl. The two flaps 22a and 22b consist of rubber sheets which are held in flap holders 58 and 58a, which are swingable about hinges 59 mounted on chute exit 60. FIG. 8 shows flaps 22a and 22b in fully opened limit position due to the fact that piston rod 61 of a pneumatic door-actuator is in its outermost withdrawn position in cylinder 62 of the actuator.

In order to close the flaps of door 22, piston rod 61 is pulled by the piston (not shown) inwardly into cylinder 62 whereby flap holder 58a is moved inwardly in the direction of arrow 58b. A first linking rod 63 is articulatedly linked at its one end to flap holder 58a, while its other end is articulatedly connected to one end of a second linking rod 66 the other end of which latter is articulatedly connected to holder element 58. As flap holder 58a moves inwardly, the connection between both linking rods is pushed upwardly and linking rod 66 pulls flap holder 58 also inwardly until door 22 is closed. Cylinder 62 is controlled via a pneumatic control line 64, and is actuated electronically by counter 18 to close door 22 each time when a determined number of fowl have passed counter 18.

When door 22 is closed fowl counted by counter 18 are for a brief period retained in the chute until a filled coop 23 has been moved away and an empty coop 23 has taken its place at the lower end of ramp 57. Door 22 of chute 19 is then again opened and the crating operation continues.

The tensioning roller 50, which takes slack out of conveyor belt 1 is supported on rocker 67 which is pulled by springs 68 against the lower reach 3 of conveyor belt 1 tensioning the same and increasing angular engagement of driving roller 5. The parts 18 and 19 of crating installation 20 can be detechably connected, e.g. by rubber hooks, to facilitate cleaning them.

FIGS. 9 to 12 show the coop-transporting device 26 in more detail.

An empty coop 23 sliding down the loading chute 25 comes to rest with its one side against the lower rail 71 of a pair of rails 71 and 71a of which the latter is at a higher level. Thus, the coop 23 resting with the lateral edges of its bottom 23c on rails 71 and 71a is in a tilted position, its bottom forming an angle of about 45° with the horizontal floor 10 (FIG. 6). Correspondingly the bottom 19a of chute 19 also has an angle of 45° with the horizontal floor 10.

Figure 11:
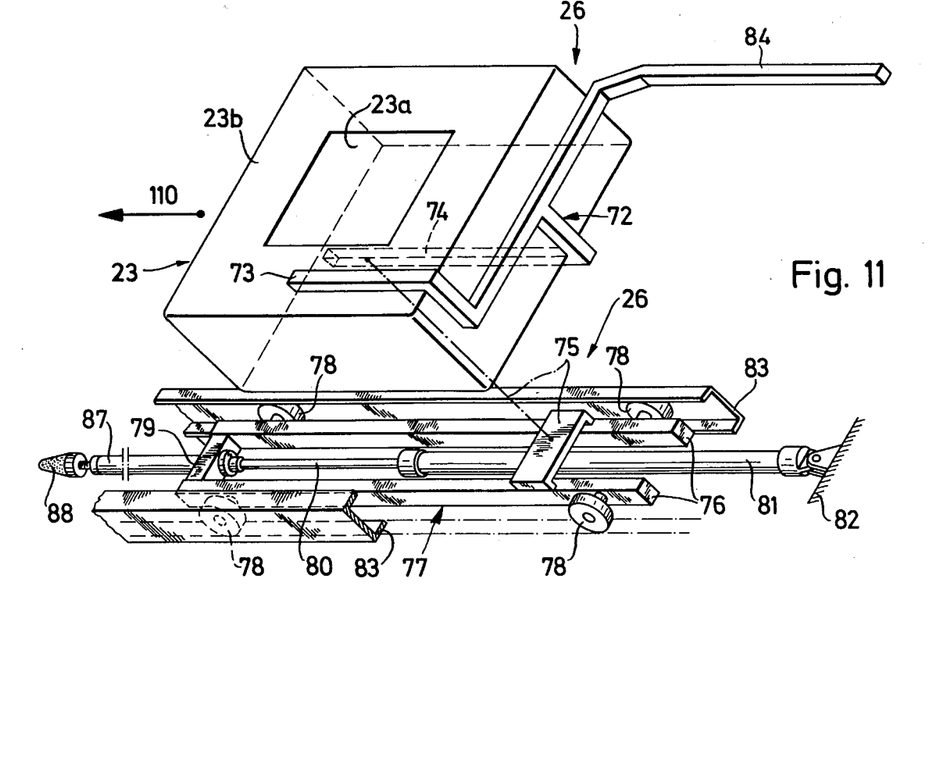
FIG. 11 is a perspective view of means for gripping and transporting the coop.

Once the coop 23 rests on rails 71 and 71a and abuts against the upstanding guard 71b of rail 71, it is engaged by a gripping element 72 of coop-transporting device 26 which comprises an upper gripper arm 73 and a lower gripper arm 74 which move into position on the top 23b and the bottom 23c of coop 23 (FIG. 11). The lower gripper arm 74 is mounted rigidly on a top cross-bar 75 of a carriage 77 (in FIG. 11, the gripping element 72 is shown in an exploded view detached above carriage 77 to facilitate understanding of this arrangement). Carriage 77 is provided with four wheels 78 which run in double angle C-shaped guide rails 83 of which the lower one is shown partly broken away for the sake of clarity. The carriage bears at its end in the coop-transporting direction a front plate 79 on the inside of which is borne the piston rod 80 of a plunger (not visible) in a cylinder 81 the end of which, facing toward the rear of carriage 77, is articulatedly mounted on a cross-bar of the stationary frame 82 of the coop-transporting device 26. When piston rod 80 is moved out of cylinder 81, obeying a signal from an electronic control unit, carriage 77 is moved along rails 83 in the direction toward chute exit 60 (FIG. 9), and carries a coop 23 seized by its gripping element 72 with it in the same direction, pushing other coops 23 ahead of the last-mentioned one along rails 71 and 71a until the first of a sequence of empty coops has its opening 23a register with exit 60 of chute 19.

Figure 9:
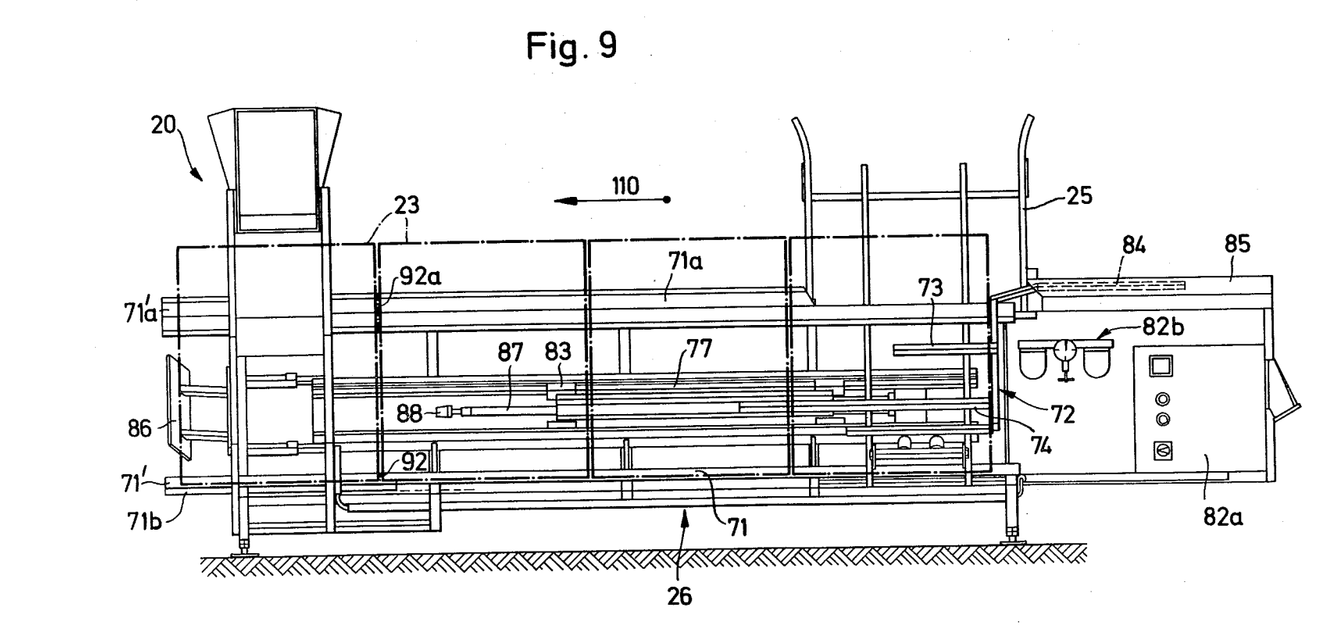
FIG. 9 is a top view of the coop-transporting means viewed in the direction of arrow IX in FIG. 6.
Figure 10:
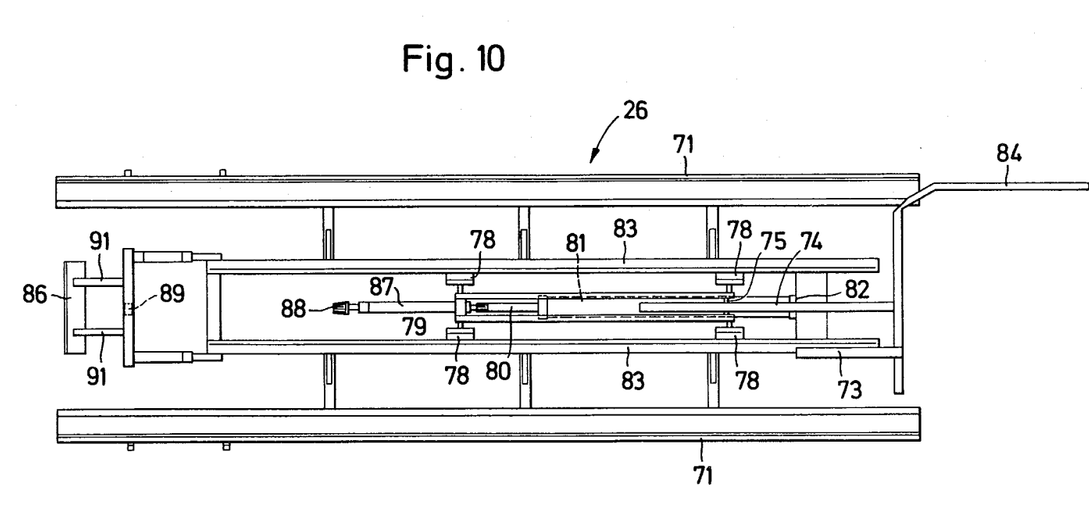
FIG. 10 is a top view of the coop-transporting means viewed in the direction of arrow X in FIG. 6.

In order to prevent further empty coops from sliding down the rail chute 25 while a coop is moved by carriage 77, the gripping element 72 bears a blocking nose member 84 which holds off a further coop from descending the loading shoot 25. For safety reasons, this nose member 84 moves under a protective hood 85 when the carriage 77 is ready to receive a new empty coop 23 (FIG. 9). A control desk 82a for actuating the entire installation and gauges 82b indicating the functioning of the operation are also conveniently built into frame 82 adjacent hood 85.

Preferably, the coop-transporting device is laid out to carry a small number, e.g. four coops at a time, on rails 71 and 71a from the loading shoot 25 to the filling station at chute exit 60.

As a filled coop is pushed out of the filling station and on to conveyor belt 29 to be reloaded on to truck or lorry 24, there is room in the coop-transporting unit for another empty coop 23.

Figure 12:
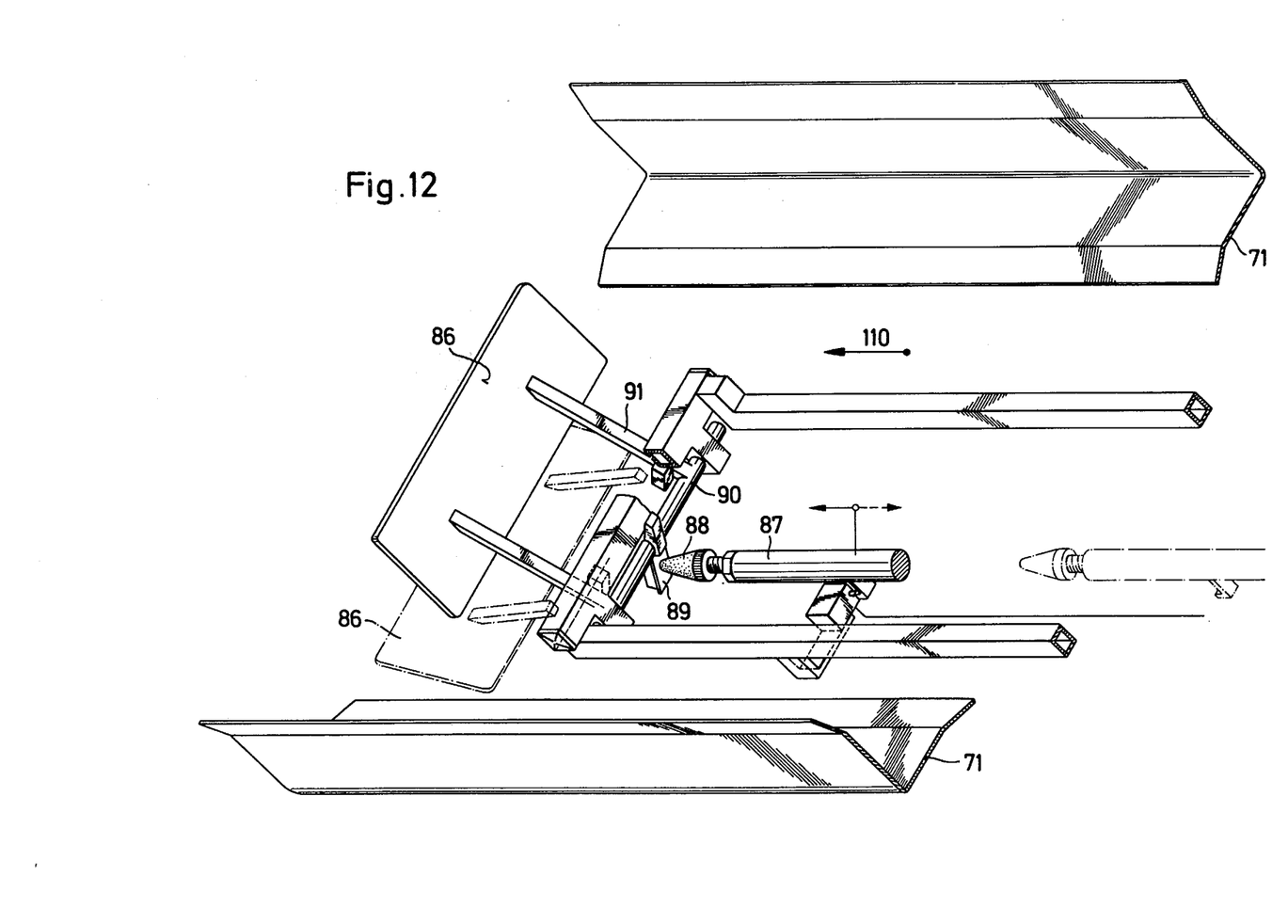
FIG. 12 is a perspective view of a stopping unit of the coop-transporting means shown in FIGS. 6 and 9 to 11.

Exact arresting of an empty coop 23 with its opening 23a registering with chute exit 60 can be achieved by means of an arrester plate 86 which cooperates with a feeler rod 87 being an extension of piston rod 80 and bearing at its free end an adjustable buffer 88 (FIGS. 11 and 12). Feeler rod 87 and buffer 88 extend forward in the direction of advancement of coops 23 underneath the latter, and are of such length that buffer 88 comes into contact with an arrester plate-elevating lever 89 which, when urged by buffer 88, is turned downwardly about a pivoting shaft 90 on which there are mounted struts 91 which carry the arrester plate 86 and are adapted to pivot together with shaft 90, being integral with the latter and with elevating lever 89. As piston rod 80, and together therewith feeler rod 87 and buffer 88, are withdrawn from abutment lever 89 in order to remove carriage 77 to its loading position, arrester plate 86 will drop under its own weight from its elevated, coop-arresting position to its horizontal position shown in phantom lines in FIG. 12, until buffer 88 contacts elevating lever 89 anew as a new empty coop is moved underneath chute exit 60. Thereby, the filled coop can be moved away from chute exit 63 across arrester plate 86 onto conveyor belt 29 (FIG. 2).

Figure 13:
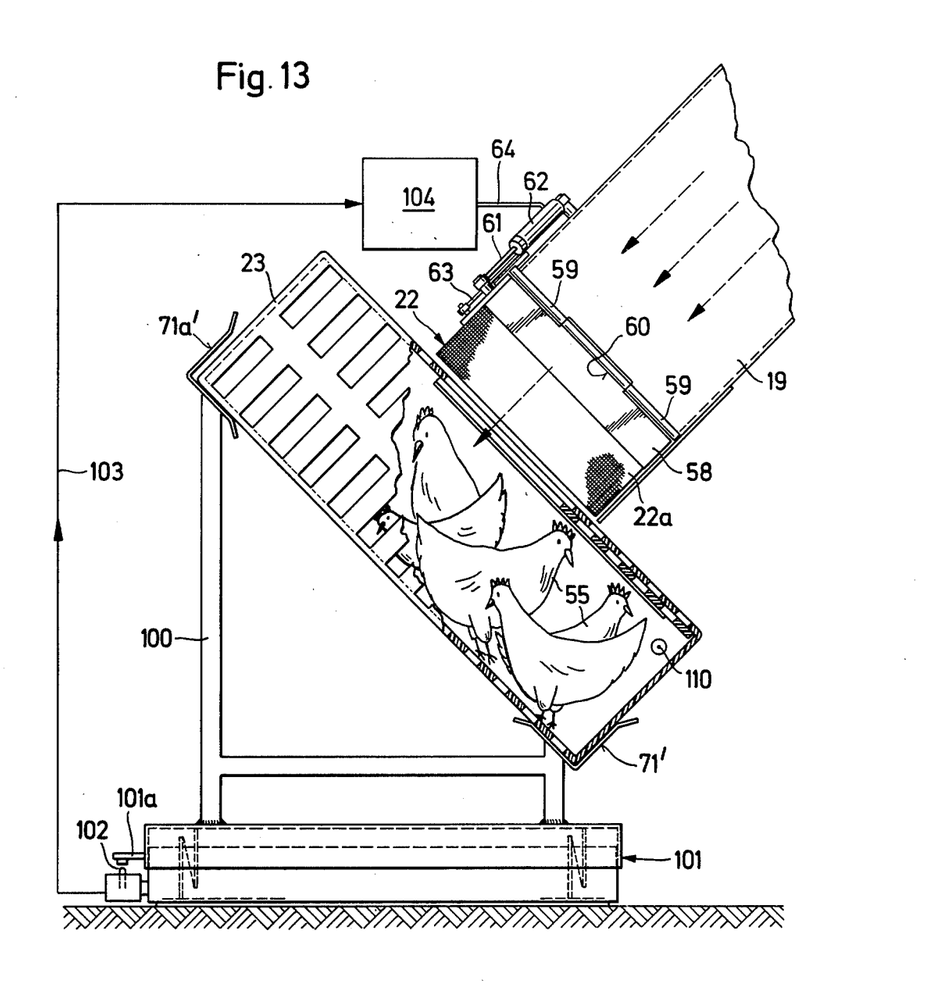
FIG. 13 is a lateral, partially sectional view of the crating means equipped with a different embodiment of a counter.

Finally, another embodiment of the counter replacing the electro-optical counter 18 in the above-described device is shown in FIG. 13.

In this embodiment, the grouping of fowl according to numbers destined to fill a coop is not achieved by interrupting a light beam between light sensitive cells 52 and 53, but instead counting is achieved by weighing the coop being filled and interrupting the filling process by closing chute door 22 whenever the coop and the fowl therein have attained a predetermined weight limit.

For this purpose guide rails 71' and 71a' are terminal sections of rail 71 and 71a as indicated in FIG. 9 which are separated from the latter by interrupting gaps 92 and 92a. Terminal sections 71' and 71a' are mounted on a supporting standard 100 which is in turn mounted on spring-borne scales 101. As a predetermined weight is reached on the scales 101, a contact nose 101a of the latter makes contact with an electric pole 102 and energizes via an electric circuit 103 an actuator 104 which actuates pneumatic (or hydraulic) line 64 and the cylinder 62 therein to close flap door 22 and thereby block chute exit 60, until a new empty coop 23 has arrived at chute exit 60.

Many details in the above-described embodiments of the installation according to the invention can be varied. Thus, a mechanical counter having a feeling member for touching by the fowl on conveyor belt 1 in entry port 51 can be employed. The conveyor belt need not be flat but can be profiled.

The cross-sectional area of channels 7 need not be rectangular but can be, for instance trapezoidal, with the upper reach 2 of conveyor belt 1 moving through the shorter or the longer parallel side of the trapezoid.

While the coops 23 are represented as having their apertures 23a in the center of the top face 23b of the coops, as is the case in most presently commercially available coops, it is preferred that such aperture is in the top face more to that side of the coop 23 which comes to rest on the upper guide rail 71a, thereby causing the filled-in fowl to move downwardly toward the lower side of the coop and free the aperture 23a for the next-following fowl, thus accelerating the filling rate.

Moreover, while the angle of inclination of chute bottom 19 and of the coop to be filled is in each case about 45 degrees as shown in FIGS. 6 and 13, it may be found preferably to choose in both cases a less steeply inclined angle, e.g. 30 or 40 degrees. The top and side walls of chute exit 60 must then be designed to project beyond the sill of exit 60, where plate 57 is joined thereto, to establish an adequate enclosure whose circumference registers well with that of the square aperture 23a of coop 23.

I claim:

1. A live poultry conveying, counting and crating device comprising:
    (a) a chicken house;
    (b) a counting station;
    (c) live poultry conveying means for conveying live poultry inside and out of the chicken house through said counting station;
    (d) a loading chute having a bottom downwardly inclined at an acute angle on which said live fowl can slide downwardly, an inlet opening at the upper end of the latter and adapted for receiving live poultry from said live poultry-conveying means, and an outlet opening at the lower end of said inclined bottom; said counting station being associated with said chute for counting live poultry passing down the latter;
    (e) a transport mechanism for transporting empty coops having an aperture in their top face to the outlet opening of said chute and coops filled with live poultry away from said outlet opening of said chute;
    said transport mechanism comprising means for stopping each coop as it arrives at said outlet opening for a time sufficient to fill said coop with a determined number of live poultry, tilting means for tilting each coop as it sojourns at said outlet opening of said chute, at an angle whereby said aperture of said coop is inclined by an acute angle toward said outlet opening, and
    wherein the angle of inclination of the coop, when in tilted position, toward the outlet opening of said chute is about 25 to 50 degrees toward the horizontal plane.

2. The device of claim 1, wherein the bottom of the loading chute is inclined downwardly at an angle of about 30 to 50 degrees toward the horizontal plane.

3. The device of claim 1, wherein said aperture in the top face of each of said coops is displaced from the center toward that side of the coop which is uppermost when the coop is in the tilted position at said outlet opening of said chute, said aperture registering with said outlet opening.

4. The device of claim 1, wherein said poultry conveying means comprises a terminal zone having a joint with the inlet opening of said loading chute, and cover means in at least said terminal zone and joint of said live poultry-conveying means and said loading chute adapted for keeping at least the said zone, joint and chute dark.

* * * * *